United States Patent [19]

Funck et al.

[11] Patent Number: 5,636,149
[45] Date of Patent: Jun. 3, 1997

[54] PC-CONTROLLED DIRECT DIGITAL SYNTHESIZER AND METHOD OF OPERATING THE SAME

[75] Inventors: Theodor Funck; Vitali Buckin, both of Göttingen, Germany

[73] Assignee: Vitaly Buckin, Dublin, Ireland

[21] Appl. No.: 256,590

[22] PCT Filed: Jan. 15, 1993

[86] PCT No.: PCT/EP93/00093

§ 371 Date: Mar. 7, 1995

§ 102(e) Date: Mar. 7, 1995

[87] PCT Pub. No.: WO93/14453

PCT Pub. Date: Jul. 22, 1993

[30] Foreign Application Priority Data

Jan. 17, 1992 [DE] Germany ............... 42 01 157.4

[51] Int. Cl.⁶ ................ G06F 1/02; G06F 7/38
[52] U.S. Cl. ................ 364/718; 364/721; 364/729
[58] Field of Search .................. 364/718, 721, 364/729; 375/377, 309, 303, 308, 329, 334; 342/200–204; 455/260, 272, 279.1

[56] References Cited

U.S. PATENT DOCUMENTS 5,216,389 6/1993 Carralero et al. ............... 331/18
5,231,598 7/1993 Vlahos ............... 364/569

FOREIGN PATENT DOCUMENTS 3124964 4/1982 Germany .
2078455 1/1982 United Kingdom .

OTHER PUBLICATIONS

EDN Electrical Design News. Bd. 34, N4. 23, 9. Nov. 1989, Newton, Massachusetts US Seiten 95–104, XP000072970 Galland "Devices refine the art of frequency synthesis".
Journal of the Acoustical Society of America Bd. 79, Nr. 2, Feb. 1986, New York US Seiten 572–574 Holland et al "A high–speed digital arbitrary waveform generator".
J. Ewert, Elektronik Sep. 1991, pp. 63–70, 72–74.
M. Schanerberger, "The Implementation of a Digital Sine Wave Oscillator Using the TMS320C25: Distortion Reduction and Applications;" IEEE Transactions on Instrumentation and Measurement, vol. 39, No. 6, Dec., 1990, pp. 870–873.
Prof. E. Philippow, TB Elektrotechnik, Band 3, VEB Verlag Technik Berlin 1967, pp. 1551–1552.

*Primary Examiner*—Paul P. Gordon
*Assistant Examiner*—Emmanuel L. Moise
*Attorney, Agent, or Firm*—Brumbaugh, Graves, Donohue & Raymond

[57] ABSTRACT

A direct digital synthesizer (DDS) (1) or digitally operating function generator has one or more channels (A, B, . . . ) each with a phase increment register and is controlled by means of a computer system (2) (e.g. a PC) by the computer system (2) sending bits of information to the DDS.(1). Each of the phase increment registers has a given bit width and in operation at every point in time a stored phase value P. The addition of a phase increment Q of a certain bit length is achieved by specific steps in the method by means of which an overflow is avoided. In control a hardware protocol (4) with a multiplexer ensures that the bits of information sent by the computer system (2) are effective in the DDS (1) either as address bits or as data bits.

20 Claims, 1 Drawing Sheet

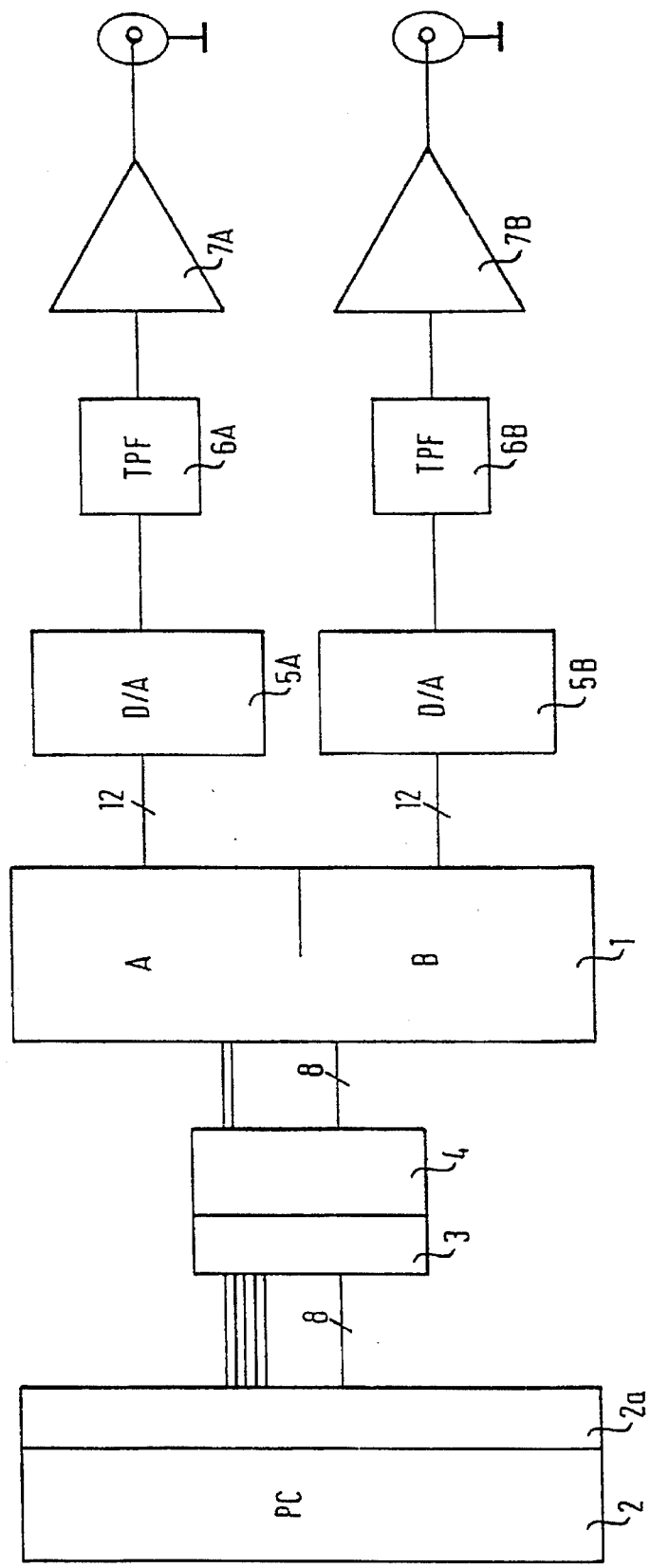

PC-CONTROLLED DIRECT DIGITAL SYNTHESIZER AND METHOD OF OPERATING THE SAME

FIELD OF THE INVENTION

The present invention relates to a method of operating a direct digital synthesizer (DDS) or digital function generator having one or more channels (A, B, ... ) each with a phase increment register and which is controllable by a computer system sending bits of information to the DDS.

DESCRIPTION OF THE RELATED ART

In function generators and synthesizers, using digital signal sources, particularly direct digital synthesizers (DDS) is known, with which signals of lower frequencies are generated from a given fixed clock frequency (see, e.g., EDN Electrical Design News, Vol 34, No. 23, Nov. 9, 1989, Newton, Mass., pp. 94–104), selected values of a stored digitized periodic function being applied to a digital-analog converter followed by a low-pass filter to generate a desired analog frequency. Selecting the values held in the storage is done by means of a so-called phase accumulator to which a phase increment is applied. This phase increment is the phase spacing of the values to be selected from the storage, applied to the phase accumulator at the clock rate. The magnitude of the phase increments is determined, on the one hand, by the clock frequency at which accumulation is done and, on the other, by the shape and frequency of the output signal to be generated. For a continuous change in frequency or phase complicated computations are necessary to continually establish the necessary phase increments which must then be continuously loaded into the registers of the phase accumulator at the speed corresponding to the change.

The application of digital signal sources thus depends on whether control is possible with small rapid changes in frequency and with quasi-continuous changes in phase. Principally the system of the direct digital synthesizer offers such possibilities, but only as long as the sequence control is possible by the controlling device to any fine degree and the interaction with this device is quickly possible.

In using the DDS system, microprocessors have been employed until recently in state of the art as the monitoring and controlling means which have been then operated either manually by a keypad or via corresponding interfaces (e.g. HPIB) by other computers.

This concept has its drawbacks for various reasons. For one thing, programming the microprocessors necessary in machine langauge or at the assembler level is tedious and thus fails to be implementable to an optimum fine degree, resulting in the advantages of the DDS system (high frequency and phase resolution) being usable only at great expense on the other hand, the microprocessors used to date are relatively slow and operating the DDS is additionally complicated by the interface between computer (e.g. for automation) and microprocessor. Apart from this, incorporating the system in computer-assisted experiments and electronic data acquisition is achievable only with difficulty. This is why those skilled in the art have recently turned to the use of a personal computer (PC) to directly control a DDS (see, e.g., Elektronik, Vol. 9/1991, J. Ewert: "Arbs": Welches Signal soll's sein?, pp. 63–70; W. Hascher: Welche "Arbs" gibt es?, pp. 72–74). However this improved control by the PC still fails to take full advantage of the DDS system.

Yet a further substantial problem is posed by the fact that to generate a quasi-continous oscillation, phase increments need to be loaded all the time in a phase increment register, the latter having only a limited storage capacity, however. To prevent an overflow, time-consuming check operations need to be executed in state of the art to establish the space still available in the register.

SUMMARY OF THE INVENTION

The present invention is accordingly based on the object of formulating a method of controlling a DDS in which the advantages of the DDS system, such as high resolution of phase and frequency, continue to be made full use of, so that with little effort both very small changes in frequency and phase as well as more particularly, major changes in frequency and phase may be implemented quasi-continuously and quickly for carrying out frequency and phase scanning.

Yet a further object of the present invention is to formulate a method of controlling a DDS in which, with little effort, phase increments are loadable continuously into a phase increment register, an overflow of the register being automatically avoided, thus eliminating the need for time-consuming check operations to establish the space still available in registers. The possibilities of the DDS system such as high accuracy and resolution of the frequency and phase, phase-continuous control of changes in frequency, continual precise monitoring of the phase, arbitrary jumps in frequency and phase as well as fast switching between several different frequencies can thus all be made better use of. In addition, the DDS 1 can be better controlled by an automatic measurement program run on a computer system.

BRIEF DESCRIPTION OF DRAWINGS

The drawing illustrates a two-channel direct digital synthesizer (DDS) in accordance with the preferred embodiment of the present invention.

DESCRIPTION OF THE PREFERRED EMBODIMENT

One preferred embodiment of the invention will now be explained in more detail with reference to the drawing.

In the embodiment shown in the drawing a two-channel direct digital synthesizer DDS 1 (Make: Qualcomm Model DDS Q 2334, 2 channel, 32-bit Phase Increment Register) having channels A and B is controlled by a PC 2 via its Centronics printer interface 2a. Instead of the printer interface 2a and other parallel interface of the PC 2 may be used. By means of the PC 2 8 bits parallel are loaded via the interface 2a into the dual-buffered input register of the DDS 1. The magnitudes necessary for the frequency and phase are computed and transferred by the PC 2. As PC 2 an IBM-compatible PC may be employed (XT, AT or more recent systems). Instead of a PC, however, any major computer system may be employed. In principle the DDS 1 may have any number of channels. Each channel contains a phase increment register (not shown) in which the phase incremenets for generating the desired frequency are stored. The PC 2 sends bits of information via a hardware protocol 4 to the DDS 1. The hardware protocol 4 not only simulates the signals necessary for handshaking but also contains a changeover switch or multiplexer which ensures that bits of information sent by the PC 2 become alternatively effective in DDS 1 as address bits or data bits. To good advantage optocouplers 3 are used for DC decoupling of PC 2 and DDS 1 between interface 2a and the hardware protocol 4 to avoid grounding problems. Channels A and B of DDS 1 are each connected at the output end to digital/analog converters 5A and 5B respectively and downstream low-pass filters 6A and 6B respectively for generating the analog output signals. By means of output amplifiers 7A and 7B the amplitude of the output signals can be adjusted and maintained constant in the frequency range of e.g. D thru 13 MHz.

By these means a highly compact system is created which is easy to use and which can be controlled via a normal printer cable by an PC, thus making it simple to integrate the control of the DDS in an automated measurement method.

Triggering the changes in frequency is achieved through the PC via the parallel interface either automatically by a program run on the PC or by manual input.

The data bits loaded in the phase increment register are generated by specific steps in the method, with which a permanent addition or subtraction of phase increment values to and from the phase value stored in the register respectively may be made without having to keep a check on register overflow. Lee the phase increment register store a bit width n and a phase value P with the bit length n, supposing now that a phase increment value Q having the bit length n is to be added or subtracted. The steps in the method then have the following effect:

$$P+Q = \begin{cases} (P+Q) & \text{when } P \leq {}^*Q \\ (P-{}^*Q-1) & \text{when } P > {}^*Q \end{cases}$$

$$P-Q = \begin{cases} (P-Q) & \text{when } P \geq {}^*Q \\ (P+{}^*Q+1) & \text{when } P < {}^*Q, \end{cases}$$

where *Q is a binary word to be complemented to Q (unary ones complement).

At the user level of the PC various operating modes (menues) can be selected.

In a first menu fixed or continuously changing frequencies (scanning) can be generated in both channels.

In addition, changeover switching between two outputs frequencies differing by a prescribed frequency is possible in channel B. The changeover frequency is derived from the frequency in channel A either by the changeover in channel B being controlled by a squarewave signal in channel A or by a selected bit of the signal in channel A at the digital level. Changeover in channel B is achievable continuously with phase.

In a second menu entries for checking the phases analogous to the entries for the frequencies in the first menu may be implemented, in addition to which the working frequency needs to be entered. In scanning the phase the first cycle begins with the phase value stated in the phase display, zero resetting the phase value being possible, if needed, prior to each new incrementing cycle, i.e. each cycle coherences at phase 0.

Operation of the generator is activated means of the function keys of the PC 2. In addition to the function key for scanning a stepping function for single steps is provided which when actuated provides only a single increment each time.

What is claimed is:

1. A method of operating a direct digital synthesizer for generating a frequency, the direct digital synthesizer having one or more channels, with each channel including an n-bit phase increment register for holding a phase increment, and means for incrementing a phase value for generating the frequency, and the direct digital synthesizer having an input for receiving from a computer system n-bit phase increment/decrement values, the method comprising:

for at least one of the channels, with its phase increment register holding a current increment value P, receiving an increment/decrement value Q;

and if Q is an increment value, replacing P with P+Q according to the following rule:

$$P+Q = \begin{cases} (P+Q) & \text{when } P \leq {}^*Q \\ (P-{}^*Q-1) & \text{when } P > {}^*Q \end{cases}$$

and if Q is a decrement value, replacing P with P–Q according to the following rule:

$$P-Q = \begin{cases} (P-Q) & \text{when } P \geq {}^*Q \\ (P+{}^*Q+1) & \text{when } P < {}^*Q \end{cases}$$

where *Q is the unary ones complement of Q.

2. The method as set forth in claim 1, wherein receiving from the computer system is via a parallel interface.

3. The method as set forth in claim 1, wherein receiving from the computer system is via a standard printer interface.

4. The method as set forth in claim 1, wherein receiving from the computer system is via a multiplexer for ensuring that the increment/decrement value is effective in the direct digital synthesizer as an address value or a data value as prescribed by the computer system.

5. The method as set forth in claim 1, wherein receiving from the computer system is via a hardware protocol including a multiplexer for ensuring that the increment/decrement value is effective in the direct digital synthesizer as an address value or a data value as prescribed by the computer system.

6. The method as set forth in claim 1, further comprising:

generating in the one of the channels a continuously changing output frequency, including a first frequency and a second frequency which differ by a difference frequency;

deriving from the output frequency a changeover frequency which lies between the first frequency and the second frequency;

effecting in another of the channels a changeover at the changeover frequency.

7. The method a set forth in claim 6, wherein effecting the changeover is controlled by a square-wave signal in the one channel.

8. The method as set forth in claim 6, wherein effecting the changeover is controlled by a selected bit of a signal in the one channel.

9. The method as set forth in claim 6, wherein effecting the changeover is continuous with phase.

10. The method as set forth in claim 1, further comprising manually entering direct-digital-synthesizer control data at the computer system.

11. The method as set forth in claim 1, further comprising generating direct-digital-synthesizer control data in the computer system under program control.

12. The method as set forth in claim 1, further comprising:

generating in the one of the channels two output frequencies which differ by a difference frequency;

deriving from the two output frequencies a changeover frequency which lies between the two output frequencies;

effecting in another of the channels a changeover at the changeover frequency;

wherein effecting the changeover is controlled by a square-wave signal in the first channel.

13. The method as set forth in claim 12, wherein effecting the changeover is continuous with phase.

14. The method as set forth in claim 1, further comprising:

generating in the one of the channels two output frequencies which differ by a difference frequency;

deriving from the two output frequencies a changeover frequency which lies between the two output frequencies;

effecting in another of the channels a changeover at the changeover frequency;

wherein effecting the changeover is controlled by a selected bit of a signal in the first channel.

15. The method as set forth in claim 14, wherein effecting the changeover is continuous with phase.

16. A direct digital synthesizer for generating a frequency, comprising:

one or more channels, with each channel including an n-bit phase increment register for holding a phase increment and means for incrementing a phase value for generating the frequency;

an input for receiving from a computer system n-bit phase increment/decrement values, operatively coupled to the incrementing means;

wherein, for at least one of the channels, with its phase increment register holding a current increment value P, and for a received increment/decrement value Q, the incrementing means is such that if Q is an increment value, P is replaced with P+Q according to the following rule:

$$P+Q = \begin{cases} (P+Q) & \text{when } P \leq {}^*Q \\ (P-{}^*Q-1) & \text{when } P > {}^*Q \end{cases}$$

and if Q is a decrement value, P is replaced with P−Q according to the following rule:

$$P-Q = \begin{cases} (P-Q) & \text{when } P \geq {}^*Q \\ (P+{}^*Q+1) & \text{when } P < {}^*Q \end{cases}$$

where *Q is the unary ones complement of Q.

17. The digital synthesizer as set forth in claim 16, wherein the input is for operative coupling to a parallel interface.

18. The digital synthesizer as set forth in claim 16, wherein the input is for operative coupling to a standard printer interface.

19. The digital synthesizer as set forth in claim 16, wherein the input is for operative coupling to a multiplexer for ensuring that the increment/decrement value is effective in the direct digital synthesizer as an address value or a data value as prescribed by the computer system.

20. The digital synthesizer as set forth in claim 16, wherein the input is for operative coupling to a hardware protocol including a multiplexer for ensuring that the increment/decrement value is effective in the direct digital synthesizer as an address value or a data value as prescribed by the computer system.

* * * * *